United States Patent [19]
Fajen et al.

[11] 4,219,815
[45] Aug. 26, 1980

[54] BULLET HIT INDICATOR SCORING SYSTEM

[75] Inventors: Lyle A. Fajen; Robert B. Malcolm; Thomas W. McDonald, all of Scottsdale, Ariz.

[73] Assignee: Motorola Inc., Schaumburg, Ill.

[21] Appl. No.: 15,695

[22] Filed: Feb. 27, 1979

Related U.S. Application Data

[63] Continuation of Ser. No. 844,685, Oct. 25, 1977, abandoned.

[51] Int. Cl.² ............... G01S 9/04; G01S 9/44
[52] U.S. Cl. ............... 343/12 MD; 343/5 PD; 343/7 PF; 343/8
[58] Field of Search ............... 343/6 A, 5 PD, 7 PF, 343/12 MD, 8

[56] References Cited
U.S. PATENT DOCUMENTS

| | | |
|---|---|---|
| 3,178,710 | 4/1965 | Ammon .................. 343/12 MD |
| 3,254,338 | 5/1966 | Healey .................... 343/8 |
| 3,742,501 | 6/1973 | Urkowitz ................. 343/8 |
| 3,803,599 | 4/1974 | McLean ................ 343/5 PD |
| 3,987,445 | 10/1976 | Fales .................. 343/112 R |
| 4,005,420 | 1/1977 | McDonald ............ 343/12 MD |
| 4,031,534 | 6/1977 | Kallmann et al. ..... 343/12 MD |
| 4,051,472 | 9/1977 | Albanese ............... 343/5 PD |

*Primary Examiner*—S. C. Buczinski
*Attorney, Agent, or Firm*—Eugene A. Parsons

[57] ABSTRACT

In a target to be towed by a vehicle, such as an airplane or the like, a radar transmitter and receiver each having separate antennas mounted in spaced apart relation at the front and back of the target, said transmitter being periodically pulsed and said receiver being turned on periodically at a given time after each pulse to produce a generally ellipsoidally shaped, shell-like sensitive volume around the target in which the radar will sense bullets, and the receiver being further constructed to sense only positive Doppler signals so that only bullets entering the sensitive volume will be scored.

13 Claims, 6 Drawing Figures

4,219,815

BULLET HIT INDICATOR SCORING SYSTEM

This is a continuation, of application Ser. No. 844,685, filed Oct. 25, 1977.

BACKGROUND OF THE INVENTION

In gunnery practice, and especially air-to-air or ground-to-air gunnery where a target is towed by an airplane, it is advantageous to the teaching process and to the testing of performance capabilities of new aircraft to provide reliable scoring. Further, it is advantageous to provide the scoring as quickly and efficiently as possible. Further, the scoring system must be relatively inexpensive and easy to operate.

Most prior art systems use an active radar scorer mounted on the target. However, these prior art systems generally are unreliable because the target is not the center of the scored volume and, consequently, a built-in scoring bias is developed, or the extreme radio frequency noise environment created by the target causes the system to be unreliable. The target has an extreme noise environment because of vibrating or intermittant metal bonds, the radar cross-section of the target vehicle's metal surfaces is immensely larger than that of a bullet producing noise which is several orders of magnitude larger than the echo signal from the bullet, and debris falling off the target when it is struck by a bullet. Many prior art systems use antenna pattern control to prevent the transmitter and/or receiver from viewing the target vehicle, thus reducing the induced noise. This approach is limited in its effectiveness by the sidelobe amplitude of the antenna patterns and cannot provide the nearly omidirectional coverage required in many instances.

SUMMARY OF THE INVENTION

The present system utilizes a transmitter antenna mounted at one end of the target and a receiver antenna mounted at the other end with the transmitter periodically pulsed and the receiver gated to turn on at some time after each pulse so as to produce a generally ellipsoidally shaped, shell-like sensitive volume surrounding the target. Through this approach the volume within the shell-like sensitive volume is a dead zone and any noise generated therein will be greatly attenuated. Further, the radar receiver is constructed to only receive positive Doppler signals so that only bullets entering the shell-like sensitive volume are counted and bullets passing through the target as well as debris falling off the target will not be scored as they pass outwardly through the shell-like sensitive volume.

It is an object of the present invention to provide an improved bullet hit indicator scoring system which is highly reliable, relatively low in cost, omidirectional and wherein the target is the center of the scored volume.

It is a further object of the present invention to provide an improved bullet hit indicator scoring system utilizing a bistatic radar wherein ambiguous range echo signals and cross-coupling interference between the transmitter and the receiver are greatly reduced.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures.

DESCRIPTION OF THE PREFERRED EMBODIMENT

Figure 1:
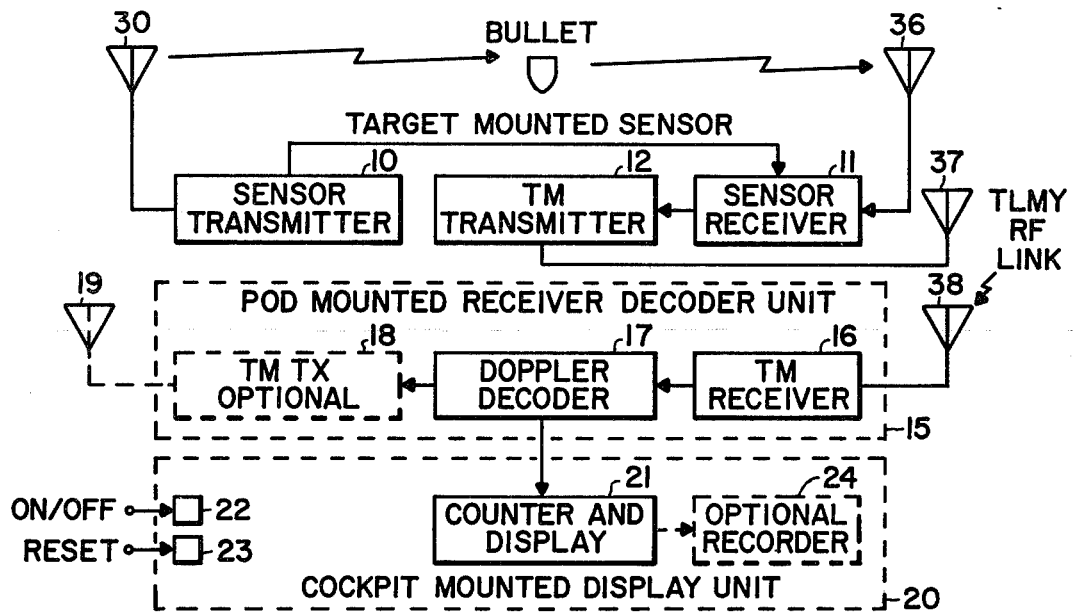
FIG. 1 is a block diagram of a bullet hit indicator scoring system embodying the present invention.

Referring specifically to FIG. 1, a system block diagram is illustrated for a bullet hit indicator scoring system adapted to be utilized with an air-to-air or ground-to-air gunnery towed target and towing airplane. The system is divided into three portions: a target mounted sensor including a sensor transmitter 10, a sensor receiver 11 and a telemetry transmitter 12; a pod mounted receiver decoder unit generally designated 15 and including a telemetry receiver 16, a Doppler decoder 17 and an optional telemetry transmitter 18 (illustrated in dotted lines to indicate the fact that it is optional); and a cockpit mounted display unit generally designated 20 including a counter and display 21, a system power switch 22, a system reset switch 23 and an optional recorder 24 (illustrated in dotted lines to indicate the fact that it is optional). The sensor transmitter 10 has an antenna 30 connected thereto and physically affixed to the rear of a target vehicle 31 (see FIG. 3) so as to provide a focus, designated 30 for convenience, of a generally ellipsoidally shaped, shell-like sensitive volume 35 of the sensor mounted radar. The sensor transmitter 10 is connected to the sensor receiver 11 which also has an antenna 36 connected thereto, which is physically mounted at the front of the target vehicle 31 to provide a second focus, designated 36 for convenience, of the ellipsoidally shaped shell 35. It should be noted that the position of the antenna 30 and 36 can be interchanged with no change in operating performance. The sensor transmitter 10 and sensor receiver 11 form a complete Doppler radar with the information from the sensor receiver 11 being connected to the telemetry transmitter 12. The telemetry transmitter 12 has an antenna 37 connected thereto which is situated to transmit energy to a receiver antenna 38 connected to the telemetry receiver 16 in the pod mounted receiver decoder unit 15. The telemetry receiver 16 is connected to the Doppler decoder 17 where information from the sensor mounted Doppler radar is converted to signals representative of bullet hits. This information can be transmitted to a ground station by way of the optional telemetry transmitter 18 and its associated antenna 19 and is also connected to the counter and display 21 mounted in the cockpit of the towing airplane. The counter and display can be simply a visual display or the optional recorder 24 can be connected thereto for maintaining a printed record (including magnetic recording). In this embodiment the receiver decoder unit 15 and the associated antennas 19 and 38 are mounted in a pod connected external to the target towing airplane (not shown) for convenience but it should be understood that they might be connected permanently within the airplane, if desired.

Figure 2:
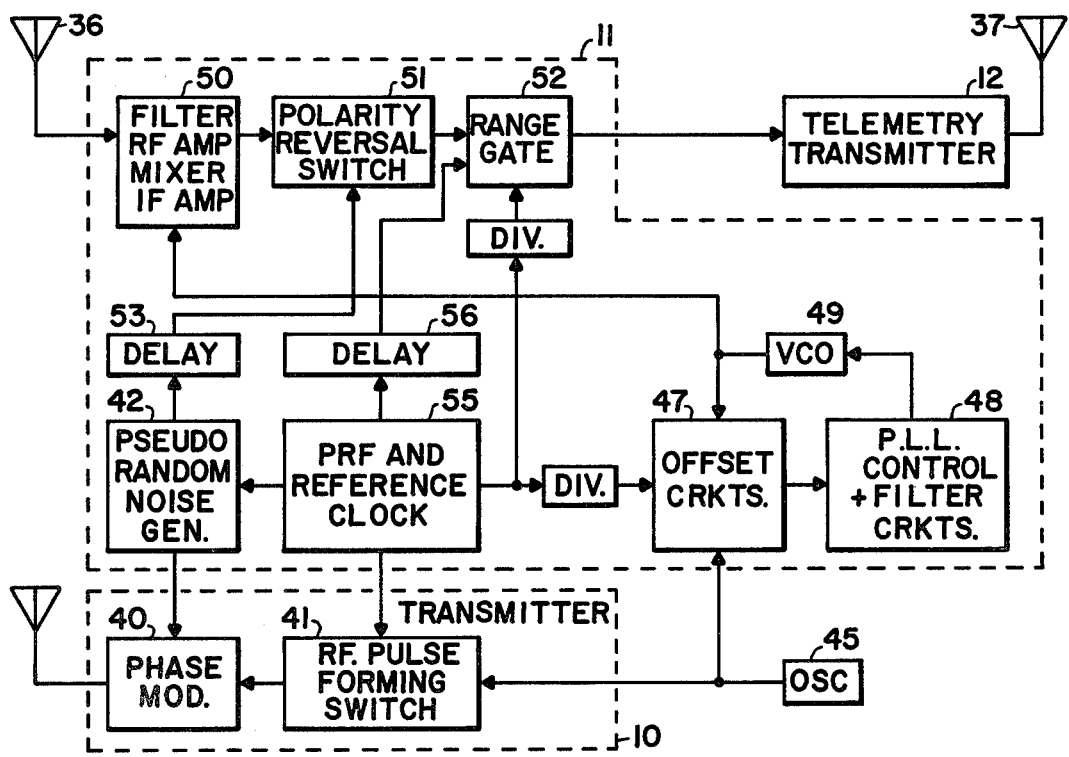
FIG. 2 is a more detailed block diagram of the sensor portion of the system illustrated in FIG. 1.

Referring to FIG. 2, a more detailed block diagram of the target mounted sensor apparatus is illustrated. The transmitter antenna 30 is connected to a phase modulator 40 in the transmitter 10. The modulator 40 receives RF energy from an RF pulse forming switch 41 and receives a modulating signal from a psuedo random noise generator 42 positioned in the receiver 11. While the psuedo random noise generator 42 is utilized in this embodiment, it should be understood that any random coded signal generator might be utilized to supply a modulating signal to the phase modulator 40. The location of the phase modulator and pulse forming switch may be interchanged. The purpose of this modulating signal will become apparent as the detailed description proceeds. The RF energy supplied to the pulse forming switch 41 is received from an oscillator 45. The RF signal from the oscillator 45 is also supplied to a block 47, which is labled "offset circuits" and which operates in conjuction with phase lock loop control and filter circuits 48 and a voltage controlled oscillator 49 to supply a local oscillator signal to the heterodyne type receiver 11 whose frequency is offset from the transmitter OSC. The receiving antenna 36 is connected to the receiver 11 by way of a box 50 labled filter, RF amp, mixer and IF circuits. The local oscillator signal from the voltage controlled oscillator 49 is also connected to the box 50 and utilized to convert the incoming RF signals to IF signals. The output signal from the IF circuits 50 is applied through a polarity reversal switch 51 and a range gate 52 to the telemetry transmitter 12. The reversal switch 51 is operated by a signal from the psuedo random noise generator 42 applied through a delay circuit 53. The receiver 11 also contains a crystal controlled clock 55 which provides the pulse repetition frequency for the radar and is connected to operate the pulse forming switch 41 in the transmitter 10, the psuedo random noise generator 42 and the range gate 52, through a pulse forming and delay network 56.

The RF signal received from the oscillator 45 is switched by the pulse forming switch 41 to provide periodic pulses of RF energy through the modulator 40 to the antenna 30. In this embodiment, the pulse forming switch 41 is a high speed diode switch which provides isolation between the oscillator 45 and the antenna 30 in the "off" state. The switch 41 requires a very high speed, high current pulse which is supplied by the pulse repetition frequency circuit 55. In the present embodiment the switch 41 is turned on for approximately 5 nanoseconds every 50 nanoseconds. The pulse repetition frequency and the width of the transmitted pulse determine the thickness of the shell-like sensitive volume 35 and aid in determining the volume thereof. The duration of each of the transmitted pulses and, hence, the thickness of the shell 35 must be sufficient to allow at least several transmitted pulses to strike each bullet as it passes through the shell 35. In this way, valid Doppler signals can be obtained. However, if the shell 35 is too thick some of the advantages of the system, i.e. singular bullet counting and noise rejection may be diminished or lost.

Figure 6:
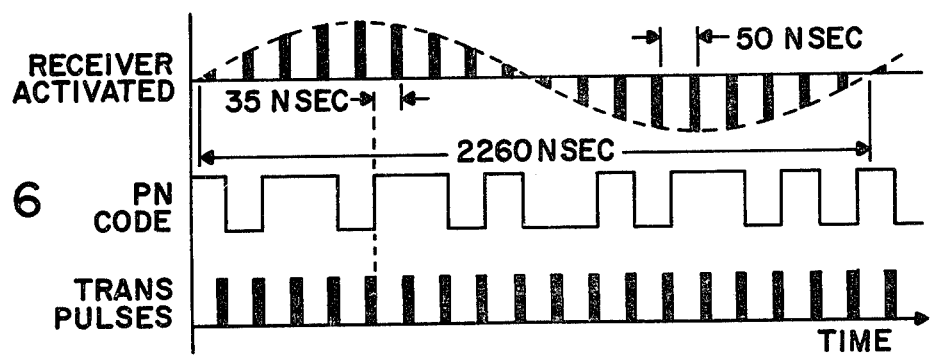
FIG. 6 is a timing diagram illustrating the activation of the various components illustrated in FIG. 1.

The reference clock 55 also toggles the psuedo random noise generator 42 which supplies a signal to the phase modulator 40 for phase modulating the RF pulses supplied by the switch 41. This phase modulation of the transmitted pulses is provided to suppress multiple time around echos and to further reduce cross-coupling interference between the transmitter 10 and the receiver 11. The generator 42 provides a random biphase code which modulates the RF pulses so as to phase shift each transmitted pulse either zero or 180°. As will be seen presently, the receiver 11 is correlated with the transmitter 10 so that echos originating from targets outside the shell 35 will be uncorrelated and will not pass through the receiver 11. Also, the generator 42 is referenced by the reference clock 55, along with the switch 41, so that changes of state of the signal from the generator 42 occur at the trailing edge of the transmitted pulses, as illustrated in FIG. 6. By making the transitions of the psuedo random noise signal coincide with the trailing edge of the transmitted pulses, any ringing or feedthrough of the RF signal subsequent to the pulse will not be correlated in the receiver and, will not be passed by the receiver. FIG. 6 also shows a representative waveform, or video pulse train, available at the input to the range gate 52 and the timing of the video pulses relative to the transmitter pulses.

Figure 4:
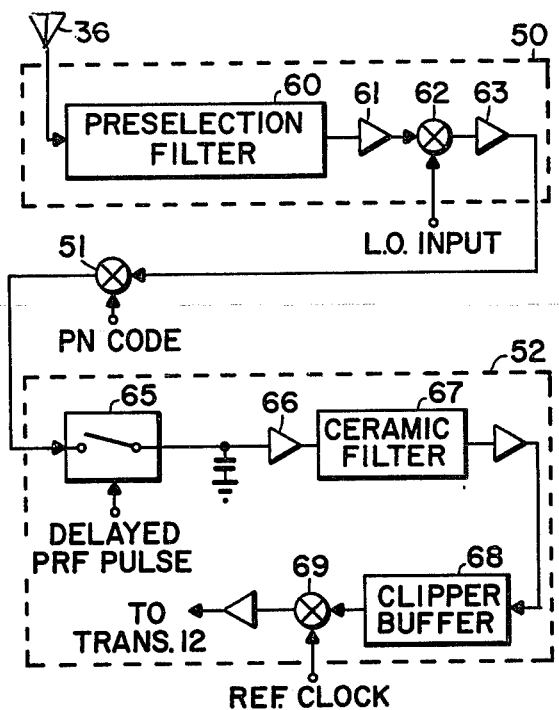
FIG. 4 is a detailed block diagram of the sensor receiver illustrated in FIG. 1.

Referring specifically to FIG. 4, a more detailed block diagram for the receiver 11 is illustrated. All echos received by the antenna 36 are supplied through a preselection filter 60 to a preamplifier 61. Output signals from the preamplifier 61 are mixed with local oscillator signals from the voltage controlled oscillator 49 in a mixer 62 and the output signals are amplified in an IF amplifier 62. The signals from the IF amplifier 63 are connected to the polarity reversal switch 51, which is toggled by the delayed random biphase signal so as to be in synchronism with the transmitter 10. Thus, echos originating within the sensitive shell 35 are correlated with respect to the receiver, and the switch 51 in conjunction with Doppler filters in the Doppler decoder 17 operate to eliminate all multiple time around echos and other echos outside the shell 35, all of which will be uncorrelated. Attenuation presented to the uncorrelated echoes is a function of the length of the psuedo random code governed by the following relationship, attenuation (dB) a 20 $Log_{10}N$, where N is the length of the code. In the present embodiment a code length (N) of 511 bits was utilized providing 54 dB rejection of multiple time around echo signals.

The signals from the polarity reversal switch 51 are connected to a sample-and-hold circuit 65 (illustrated schematically as a single pole switch and a storage capacitor). The sample and hold circuit 65 is operated by pulses from the pulse repetition frequency clock 55 which are delayed in the delay network 56 (see FIG. 2). In this embodiment the pulses are delayed approximately 35 nanoseconds and have a duration of 5 nanoseconds, which coincides with the duration of the transmitted pulses. Thus, the sample-and-hold circuit 65 forms a window which allows all echos appearing at the receiver at some period of time (35 nanoseconds) subsequent to the transmitted pulse to pass therethrough.

The signal applied to the sample-and-hold circuit 65 is a bipolar pulse train of 5 nanosecond wide echo pulses whose envelope reverses polarity at the intermediate frequency, which is the frequency offset between the transmitter oscillator 45 and the receiver local oscillator (VCO 49), plus the Doppler shift frequency. Because the sample-and-hold circuit 65 is in the video chain the switch can be made from inexpensive Schottky diodes whereas more expensive pin diodes ordinarily must be used when a muting switch is required in the RF channel of the receiver. It is possible to eliminate the muting switch from the RF channel in this embodiment because of the low transmitter to receiver coupling resulting from spacing apart the antennas 30 and 36. Eliminating the RF switch ahead of the receiver and performing all switching in the video chain eliminates self-generated generated beat note signals due to high order harmonics of the pulse rate frequency hetrodyning with the receiver local oscillator. Once generated, these beat note signals cannot be distinguished from true Doppler signals and thus constitute a serious source of false scores. The sample-and-hold switch 65 (the receiver activating switch) in the video chain circumvents the beat note problem, since transients present at the output of the switch 65 are never mixed with the receiver local oscillator signals and, therefore, no beat notes are produced. Thus, the sample-and-hold circuit 65 samples the video signal for a period of 5 nanoseconds at the pulse repetition frequency rate and stores the samples so as to construct a sine wave from the video pulses lying within this time window.

The output from the sample-and-hold circuit 65 is amplified in an amplifier 66 and applied to a ceramic filter 67. The ceramic filter 67 passes only the positive Doppler signals, or echos produced by inbound bullets. In the present embodiment an IF of 443 kilohertz is utilized so that the IF plus Doppler shift is generally in the range of 445 kilohertz to 465 kilohertz. The 443 kilohertz IF is used so that a relatively inexpensive ceramic filter can be used to separate the positive Doppler signals. The output signals from the ceramic filter 67 are amplified, clipped and applied through a buffer 68 to a mixer 69 connected to receive a signal of approximately 332.0 kilohertz frequency derived from the reference clock 55. The video signal is in this manner down-converted to provide a 110kHz output signal that is within the video passband of the telemetry receiver 16.

The output signal from mixer 69 frequency modulates the telemetry transmitter 12 for transmission of Doppler data to the pod mounted receiver 15. The telemetry transmitter 12 is modulated at a Doppler varying 110kHz intermediate frequency, rather than being converted to baseband, in order to provide a high and constant modulation index for all anticipated Doppler frequencies.

Figure 5:
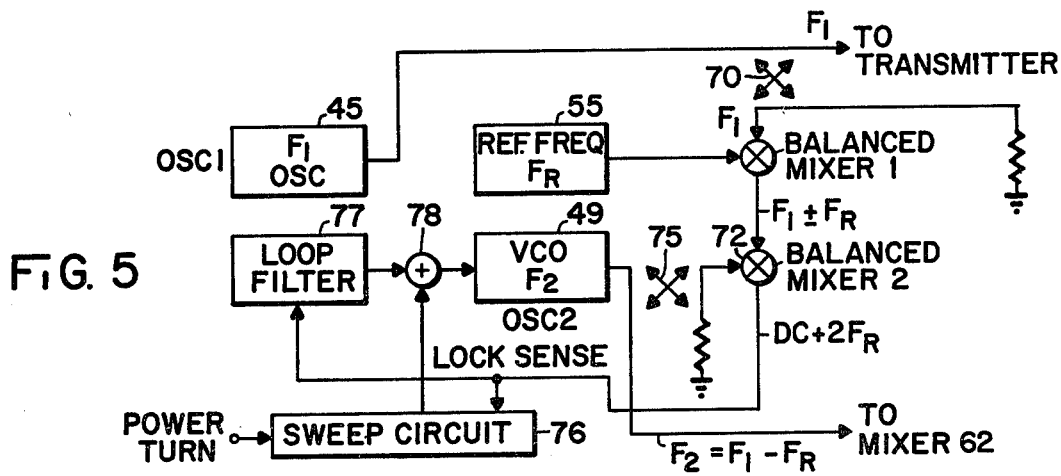
FIG. 5 is a detailed block diagram of the local oscillator utilized in the sensor of FIG. 1.

Referring to FIG. 5, a block diagram of the local oscillator system for the transmitter 10 and receiver 11 is illustrated. The oscillator 45 provides the RF signal to the transmitter 10, as previously described, and a portion of this signal is coupled at 70 to one input of a balanced mixer 71. A second input of the mixer 71 is received from the reference clock 55 by way of a reference divider (see FIG. 2). This reference frequency from the reference clock 55 is the IF of the receiver 11 which, in this embodiment is 443 kilohertz. The output signal from the mixer 71, which is the transmitter frequency plus or minus the IF, is applied to an input of a second balanced mixer 72. The voltage controlled oscillator 49 supplies the local oscillator frequency to the mixer 62 in the receiver 11, as previously discussed with reference to FIG. 4. The local oscillator frequency must be the transmitter frequency minus the IF. A portion of the output of the VCO 49 is coupled, by way of coupling 75, to a second input of the balanced mixer 72. The output of the mixer 72, which is twice the frequency of the IF, is connected to a sweep circuit 76 through a lock-sense input. The sweep circuit 76 also has a power turn on input. The output of the balanced mixer 72 is further connected through a loop filter 77 to a mixer 78 which also receives the output of the sweep circuit 76. The output of the mixer 78 controls the frequency of the voltage controlled oscillator 49. To guarantee a correct lock, the sweep circuit 76 forces the voltage controlled oscillator 49 to the low end of its frequency range and then slowly increases the frequency until lock is achieved. Lock is accompanied by an 886 kilohertz signal (twice the IF) present at the output of the mixer 72. The sweep circuit 76 senses the presence of this signal at the output of the mixer 72 and reinitiates the sweeping procedure if for any reason lock is lost. Thus, the local oscillator system illustrated in FIG. 5 is a dual local oscillator designed to provide two reference frequencies whose separation is precisely controlled so as to provide the IF for the receiver 11 at the difference between the two frequencies provided by the local oscillator.

Figure 3:
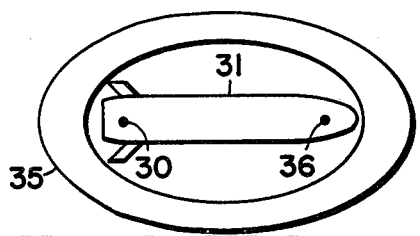
FIG. 3 is a cross-sectional representation of the radar sensitive volume and its relationship to the target.

Thus, the present system includes a bistatic radar mounted on a target with the transmitter antenna mounted adjacent one end of the target and the receiver antenna mounted adjacent the other end of the target. The transmitter of the radar is pulsed and the receiver is activated for a short period of time subsequent to each pulse so that a generally ellipsoidally shaped, shell-like sensitive volume is produced around the target as illustrated in FIG. 3. This shell-like sensitive volume closely simulates the target and the target 31 is the center of the scored volume so that during gunnery practice no training bias is generated which might seriously degrade performance in actual combat. The pulsed transmitter and gated receiver concept eliminate target noise interference through time discrimination, and the use of random coded biphase modulation in the sensor transmitter, which is subsequently decoded and correlated by the sensor-receiver, eliminate multiple time around interference, i.e. low altitude ground clutter, shooter aircraft, and multiple bullets located outside the desired scoring area. Further, the use of only positive Doppler discriminates against the scoring of impact debris and double scoring because of outbound projectiles leaving the ellipsoidal shell. In addition, the Doppler decoder 17 in the pod mounted receiver-decoder unit 15 includes Doppler bin-type filters, each of which filters is tuned to a relatively narrow bandpass to provide enhanced signal-to-noise ratio. Since the decoder 17 is located at the target towing vehicle it does not form a portion of the target mounted sensor and further reduces the cost of the sensor.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:
1. A bullet hit indicator scoring system for use with a target comprising:
  (a) a radar transmitter mounted on the target and having an antenna mounted on the target:
  (b) a compatible radar hetrodyne type receiver mounted on the target, having an antenna mounted on the target in spaced relation from the transmitter antenna and including means providing an output only in response to positive Doppler signals; and

(c) means connected to said transmitter and said receiver for causing said transmitter to transmit periodic pulses of energy and for periodically activating said receiver so as to produce a generally ellipsoidally shaped, shell-like sensitive volume surrounding the target and spaced therefrom in which the radar will sense bullets.

2. A bullet hit indicator scoring system as claimed in claim 1 wherein each pulse of energy from the transmitter is approximately 5 nanoseconds in duration and the receiver is activated approximately 35 nanoseconds after each transmitter pulse for a period of approximately 5 nanoseconds.

3. A bullet hit indicator scoring system as claimed in claim 1 wherein the system further includes a telemetry transmitter for relaying bullet hit information to tow planes and the like.

4. A bullet hit indicator scoring system as claimed in claim 1 wherein the receiver is a hetrodyne type of receiver having an RF and a video section and a switch for periodically activating the receiver is located in the video section.

5. A bullet hit indicator scoring system as claimed in claim 4 wherein the switch in the video section of the receiver includes Schottky diodes.

6. A bullet hit indicator scoring system as claimed in claim 1 wherein the transmitter includes circuitry for encoding the periodic pulses of transmitted energy with a random coded biphase signal.

7. A bullet hit indicator scoring system as claimed in claim 6 wherein the receiver is a heterodyne type of receiver with an RF and a video section and switching apparatus is connected to the video section and further connected to receive the random coded biphase signal for activating the receiver in synchronism with the transmitted radar signal.

8. A bullet hit indicator scoring system as claimed in claim 6 wherein the means connected to the transmitter for causing said transmitter to transmit periodic pulses and the circuitry for encoding the periodic pulses are constructed and timed so that each transition of the random coded biphase signal is approximately coincident with the trailing edge of a periodic pulse.

9. A bullet hit indicator scoring system for use with a target towed by a vehicle, such as an airplane or the like, said system comprising:
(a) a Doppler radar transmitter mounted on the target and having an antenna mounted on the target;
(b) a Doppler radar hetrodyne type receiver mounted on the target, having an antenna mounted on the target in spaced relation from the transmitter antenna and including means providing an output only in response to positive Doppler signals;
(c) means connected to said transmitter and to said receiver for causing said transmitter to transmit periodic pulses of energy and for periodically activating said receiver so as to produce a generally ellipsoidally shaped, shell-like sensitive volume surrounding the target and spaced therefrom in which the radar will sense bullets;
(d) a telemetry transmitter connected to said radar receiver and mounted on the target for transmitting received radar information;
(e) a telemetry receiver mounted on the towing vehicle for receiving transmitted radar information and processing the information to provide a signal indicative of the number of bullets entering the sensitive area; and
(f) an indicator mounted on the towing vehicle and connected to said telemetry receiver for receiving the signal indicative of the number of bullets entering the sensitive volume and providing an indication thereof.

10. In a bistatic radar including a transmitter and receiver each having an antenna, with the antennas mounted in spaced apart relationship, apparatus for improving the rejection of ambigious range echo signals and cross-coupling interference between the transmitter and the receiver, said apparatus comprising:
(a) switching means associated with the transmitter for causing the transmitter to transmit periodic pulses of energy;
(b) a random coded signal generator;
(c) encoding means associated with the transmitter and connected to receive a random coded biphase signal from said generator for encoding the periodic pulses of transmitted energy with the random coded signal; and
(d) timing means connected to said switching means and said generator for timing the operation thereof so that each transition of the random coded biphase signal is approximately coincident with the trailing edge of a periodic pulse.

11. Apparatus as claimed in claim 10 wherein the timing means includes a reference oscillator.

12. Apparatus as claimed in claim 10 wherein the random coded signal generator is a biphase signal generator.

13. Apparatus as claimed in claim 10 wherein the random coded signal generator is a psuedo random noise generator.

* * * * *